United States Patent
Odagiri et al.

(10) Patent No.: US 7,538,942 B2
(45) Date of Patent: May 26, 2009

(54) LIGHT DIFFUSING FILM AND METHOD OF PRODUCING THE SAME AS WELL AS SCREEN

(75) Inventors: Hirokazu Odagiri, Miyagi (JP); Hiroyuki Kiso, Miyagi (JP)

(73) Assignee: Sony Corporation, Tokyo (JP)

( * ) Notice: Subject to any disclaimer, the term of this patent is extended or adjusted under 35 U.S.C. 154(b) by 362 days.

(21) Appl. No.: 11/147,625

(22) Filed: Jun. 8, 2005

(65) Prior Publication Data
US 2005/0275952 A1    Dec. 15, 2005

(30) Foreign Application Priority Data
Jun. 8, 2004    (JP) .......................... P2004-169691

(51) Int. Cl.
*G03B 21/60*    (2006.01)
(52) U.S. Cl. .................................... 359/455
(58) Field of Classification Search ............... 359/443, 359/449, 455–457, 459
See application file for complete search history.

(56) References Cited

U.S. PATENT DOCUMENTS

| | | | |
|---|---|---|---|
| 3,754,813 A * | 8/1973 | Depalma et al. ............ 359/454 |
| 3,791,712 A * | 2/1974 | Miyagi ....................... 359/455 |
| 5,534,386 A | 7/1996 | Petersen et al. |
| 6,292,294 B1 | 9/2001 | Takahashi et al. |
| 6,597,502 B2 * | 7/2003 | Takahashi et al. ........... 359/456 |
| 6,600,600 B2 * | 7/2003 | Chen .......................... 359/459 |
| 6,894,835 B2 * | 5/2005 | Ohsako et al. .............. 359/449 |
| 7,009,774 B2 * | 3/2006 | Yoshikawa et al. .......... 359/626 |

FOREIGN PATENT DOCUMENTS

| | | |
|---|---|---|
| GB | 1421138 | 1/1976 |
| JP | 62-157023 | 7/1987 |
| JP | 01237634 | 9/1989 |
| JP | 8029875 | 2/1996 |
| JP | 10-197957 | 7/1998 |
| JP | 2000258843 | 9/2000 |
| JP | 2001100621 | 4/2001 |
| JP | 2001-121548 | 5/2001 |
| JP | 2002-365405 | 12/2002 |
| JP | 2003-029344 | 1/2003 |
| JP | 2003-080598 | 3/2003 |
| JP | 2004-061546 | 4/2004 |
| JP | 2004-098256 | 4/2004 |
| JP | 2005-070631 | 3/2005 |
| JP | 05-297465 | 10/2005 |
| WO | 02/077672 | 10/2002 |

* cited by examiner

*Primary Examiner*—Christopher E Mahoney
(74) *Attorney, Agent, or Firm*—K&L Gates LLP (57) ABSTRACT

A light diffusing film, a screen that utilizes same, and a method of producing same are provided.

The light diffusing film provides a high luminance uniform over an overall area with a simple configuration and provides a good visibility. Also a method of producing the light diffusing film as well as a screen in which the light diffusing film is used are disclosed. The light diffusing film includes a base film, and a light diffusing layer formed on a principal surface of the base film and having a group of micro lenses each having a convex or concave shape which has different curvatures from each other along cross sections in a transverse direction and a vertical direction of the principal surface of the base film. The micro lenses individually have optical axes which are inclined toward the position of an assumed viewer forwardly of the light diffusing film.

9 Claims, 6 Drawing Sheets

| A * | B * | C * | D * |
|---|---|---|---|
| E * | F * | G * | H * |
| I * | J * | K *X• | L * |
| M * | N * | O * | P * |

| 0.83 * A | 0.89 * B | 0.87 * C | 0.82 * D |
|---|---|---|---|
| 0.97 * E | 0.98 * F | 0.99 * G1.0• | 0.97 * H |
| 0.97 * I | 0.97 * J | 0.99 * K | 0.98 * L |
| 0.82 * M | 0.86 * N | 0.86 * O | 0.85 * P |

| 0.65 * A | 0.67 * B | 0.69 * C | 0.64 * D | ~8 |
| --- | --- | --- | --- | --- |
| 0.85 * E | 0.87 * F | 0.89 * G | 0.88 * H | |
| 0.86 * I | 0.85 * J | 0.89 * K | 0.88 * L | |
| 0.64 * M | 0.64 * N | 0.68 * O | 0.65 * P | |

1.0 •

LIGHT DIFFUSING FILM AND METHOD OF PRODUCING THE SAME AS WELL AS SCREEN

CROSS REFERENCES TO RELATED APPLICATIONS

This application claims priority to Japanese Patent Document No. 2004-169691, filed on Jun. 8, 2004 with the Japanese Patent Office, which disclosure in its entirety is hereby incorporated by reference.

BACKGROUND

The present invention relates to a light diffusing film and a method of producing the same as well as a screen which is formed using the light diffusing film.

In recent years, an overhead projector or a slide projector is used widely as an apparatus which is used by a speaker in a meeting or the like to present information materials. Also in ordinary homes, a video projector or a moving picture film projector which is formed using liquid crystal is being popularized. Such projectors as mentioned above employ a projecting method wherein light outputted from a light source is optically modulated, for example, by means of a liquid crystal panel of the transmission type or the like to form image light, and the image light is emitted through an optical system such as a lens so as to be projected on a screen.

For example, a projector apparatus which can form a color image on a screen includes an illuminating optical system for demultiplexing a light beam emitted from a light source into color light fluxes of red (R), green (G) and blue (B) and converging the color light fluxes into predetermined light paths. The projector apparatus further includes a liquid crystal panel (light valve apparatus) for optically modulating the color light fluxes of R, G and B demultiplexed by the illuminating optical system. The projector apparatus further includes a light multiplexing section for multiplexing the color light fluxes of R, G and B optically modulated by the liquid crystal panel. Thus, a color image multiplexed by the light multiplexing section is projected in an enlarged scale on a screen by a projection lens.

Recently, also a projector apparatus of a type wherein a narrow-band three-primary color light source is used as a light source and a grating light valve (GLV) apparatus is used in place of a liquid crystal panel to spatially modulate color light fluxes of R, G and B has been developed.

In the projector apparatus just described, a projector screen is used in order to allow a viewer to watch a projected image. Projector screens can be roughly divided into a front projector screen on which projection light is illuminated from the front side such that the view watches the projected light reflected from the screen, and a rear projector screen on which projection light is illuminated from the rear side such that the viewer watches the light transmitted through the screen from the front side of the screen. In recent years, while the size of the screen has been increasing with the enhancement of the performance of the projector, it is demanded for a screen of any type to have a characteristic that the visibility is good with a high luminance free from non-uniformity.

Of whichever type a screen is, generally a light diffusing film for diffusing light is provided on the surface of the screen. Since image light is diffused by and emitted uniformly from the light diffusing film, the viewer can visually sense the projected image. Accordingly, in order to implement a screen having the characteristic described above, special functions are demanded for the light diffusing film.

A first one of the functions required for the light diffusing film is that, in order to utilize image light effectively to assure a high luminance of the screen, light can be diffused and emitted restrictively toward a region in which presence of an observer is estimated. A second one of the functions is that the luminance of a peripheral portion of the screen which is unfavorable in regard to the visual angle when compared with a central portion of the screen is enhanced to reduce the non-uniformity in luminance.

The first function distributes image light only toward a region in which it is estimated that a viewer or viewers are present. If it is supposed that the seated positions of a viewer is fixed, then considerable diffusion is not required in the upward and downward directions of the line of sight (in the vertical direction on the screen). However, in regard to the horizontal direction, preferably the diffusion is great to some degree from the point of view of the range of the position at which the viewer is seated in an opposing relationship to the screen (width of a row of viewers). Where unnecessary diffusion in the vertical direction is eliminated in this manner, the luminance of the entire screen is enhanced and a projected image which is less liable to be influenced by external light is achieved. This function is generally called anisotropic diffusion. In this instance, it is necessary for anisotropic diffusion to be small in the vertical direction but greater in the horizontal direction.

Light from a projector projected on a screen is diffused on the surface of the screen with respect to an optical axis directed in the direction of regular reflection. Accordingly, most of light diffused by and emitted from an upper end or a lower end of the screen is radiated uselessly to the outside of the screen. Particularly where the anisotropic diffusion is low in the vertical direction, the flux of light toward the viewer further decreases. In particular, since a region in which the luminance is low appears at the upper end or the lower end of the screen, the region is perceived as a dark striped portion by the viewer and obstructs good appreciation. This is luminance non-uniformity, and the second function eliminates or moderates the luminance non-uniformity.

Meanwhile, a transparent film formed by dispersedly applying resin particles to a resin binder, a resin film having a surface worked into a matted state and a like film are conventionally available. However, such conventional films as just mentioned isotropically diffuse projected light from a projector and cannot avoid lowering the luminance. Simultaneously, it is very difficult in principle for the films mentioned to control the anisotropic diffusion of light.

On the other hand, in order to implement anisotropic diffusion of light, a method is available wherein a speckle pattern appearing when a coherent light flux is illuminated on a roughened surface is formed on a photosensitive material. The method is disclosed, for example, in Japanese Patent No. 3,413,519. The speckle diffuser is advantageous and very useful not only in that effective anisotropic diffusion of light can be obtained regarding individual speckle patterns as micro lenses having a major axis in the vertical direction but also in that, since the speckle patterns are arranged at random in configuration, a moire pattern or coloring by interference of light does not appear.

However, if the diffuser disclosed in Japanese Patent No. 3,413,519 is used for a screen of the reflection type, then a portion at which the luminance is insufficient appears at an upper end portion and a lower end portion of the screen because the diffusion in the vertical direction of the field of view is small, and this tendency appears comparatively conspicuously as the screen size increases. In this instance, it is possible to enhance the luminance against insufficiency by forming an upper end and a lower end of the screen in a curved configuration or by disposing the screen so as to be inclined toward the viewer. However, the countermeasures are not suitable for universal use because they are restricted in practical use in that it is difficult to take up and accommodate the former while the latter requires provision of a special inclining mechanism.

Therefore, a screen wherein a light transmitting diffusing layer is provided on the front surface side of a transparent sheet and a linear Fresnel lens for reflecting light is provided on the rear surface side of the transparent sheen has been proposed and is disclosed in Japanese Patent No. 3,341,225. In the screen of Japanese Patent No. 3,341,225, the Fresnel lens surface formed on the rear surface side of the transparent sheet not only reflects projected light but also has an action as an aspheric concave mirror for condensing light. Therefore, the screen has a performance of converging and reflecting light efficiently toward the viewer side.

However, according to the screen disclosed in Japanese Patent No. 3,341,225, not only the front surface side but also the rear surface side of a transparent sheet must be worked. This cannot avoid increase of the expenses for the equipment and decrease of the yield of products, resulting in increase of the cost.

SUMMARY

The present invention provides in an embodiment a light diffusing film having a high luminance uniform over an overall area with a simple configuration and provides a good visibility and a method of producing the light diffusing film as well as a screen in which the light diffusing film is used.

According to an embodiment of the present invention, there is provided a light diffusing film including a base film, and a light diffusing layer formed on a principal surface of the base film and having a group of micro lenses each having a convex or concave shape which has different curvatures from each other along cross sections in a transverse direction and a vertical direction of the principal surface of the base film, the micro lenses individually having optical axes which are inclined toward the position of an assumed viewer forwardly of the light diffusing film.

With the light diffusing film, not only the diffusion angle of each emerging light flux is provided with anisotropy in the vertical and transverse directions, but also a portion of each emerging light flux which has a comparatively high luminance is directed to a viewer, that is, a peak position of a luminance distribution in a diffusion characteristic is displaced to the viewer side. Consequently, diffused light having a high luminance and having no non-uniformity in luminance can be obtained from the light diffusing film.

Preferably, the optical axes of the micro lenses are inclined in the vertical direction of the principal surface of the base film.

Further preferably, the inclination angle of the optical axis of each of the micro lenses is set so as to be 0° at a position on the principal surface of the base film which coincides with a horizontal line of sight of the assumed viewer and gradually decrease in a direction toward an upper end of the base film but gradually increase in a direction toward a lower end of the base film as the distance increases in the vertical direction from the position. Preferably, the inclination angles of the optical axes of the micro lenses remain within a range from −25° to 25°.

With the light diffusing films, the luminance distribution of diffused light in the vertical direction can be uniformized.

According to another embodiment of the present invention, there is provided a method of producing a light diffusing film, including a transfer roll machining step of continuously varying a cut-in amount of a cutting tool in an interlinked relationship with rotation of a transfer roll to machine the surface of the transfer roll to form, on the surface of the transfer roll, a plurality of micro lens patterns each having a concave shape which has different curvatures from each other along cross sections in a circumferential direction and an axial direction of the transfer roll, an application and contact bonding step of applying a resin material, which absorbs and cures with energy, to the surface of the transfer roll and then contact bonding a base film to the resin, and a hardening step of applying energy to the resin so as to be hardened to form a group of micro lenses, the transfer roll machining step being performed such that, while the micro lens patterns are successively formed on a circumference of the transfer roll using the cutting tool, the maximum cutting tool cut-in position at which the cut-in amount of the cutting tool is maximum within a range of cutting of the cutting tool is gradually displaced in the direction of the circumference of the transfer roll.

Preferably, a micro lens pattern wherein the maximum cutting tool cut-in position is the center of a cut-in range of the cutting tool is provided at an arbitrary position on the circumference of the transfer roll, and as the distance increases in the circumferential direction of the transfer roll from the location, the maximum cutting tool cut-in position of a micro lens pattern is displaced gradually in one direction on the circumference of the transfer roll from the center of the cut-in range of the cutting tool.

Preferably, the cut-in amount of the cutting tool into the transfer roll is controlled by fine driving of a piezoelectric element actuator.

With the methods of producing a light diffusing film, a light diffusing film having a characteristic of anisotropy in diffusion angle and another characteristic that a portion of each emerging light flux which has a comparatively high luminance is directed to a viewer can be produced simply and readily and besides with a high degree of accuracy.

According to a further embodiment of the present invention, there is provided a screen, including a support member, a reflecting layer provided on the support member, and a light diffusing film provided on the reflecting layer and including a base film and a light diffusing layer formed on a principal surface of the base film and having a group of micro lenses each having a convex or concave shape which has different curvatures from each other along cross sections in a transverse direction and a vertical direction of the principal surface of the base film, the micro lenses individually having optical axes which are inclined toward the position of an assumed viewer forwardly of the light diffusing film.

Preferably, the reflecting layer is an optical multilayer film which includes a first optical film having a high refractive index and a second optical film having another refractive index lower than that of the first optical film, the first and second optical films being laminated alternately to form 2n+1 layers which form the reflecting layer, n being an integer equal to or greater than 1, the optical multilayer film having a high reflection characteristic with respect to light in a particular wavelength region while the optical multilayer film has a high transmission characteristic with respect to light at least in the visible wavelength region other than the particular wavelength region.

The screen may further include a dark light absorbing layer provided on the rear surface side of the support member.

With any of the screens, since the light diffusing film described above is used as the surface of the screen, image light is always distributed to a viewer. Consequently, the screen can display an image of high visibility which has a high luminance and has no non-uniformity in luminance over an entire area thereof.

Additional features and advantages of the present invention are described in, and will be apparent from, the following Detailed Description and the figures.

DETAILED DESCRIPTION OF THE INVENTION

Light Diffusing Film

Figure 1:
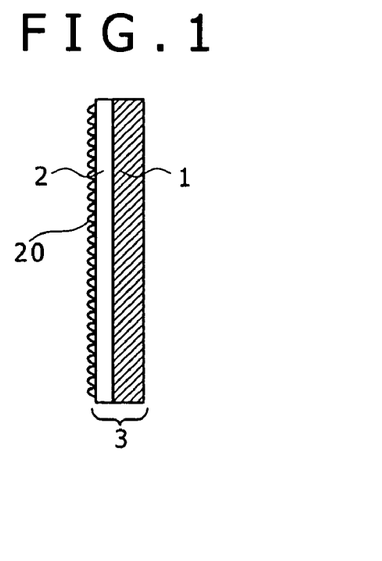
FIG. 1 is a schematic sectional view showing a configuration of a light diffusing film according to an embodiment of the present invention.

Referring first to FIG. 1, there is shown an example of a configuration of a light diffusing film to which the present invention is applied in an embodiment.

The light diffusing film 3 includes a base film 1, and a light diffusing layer 2 formed on a principal surface of the base film 1 and including a group of micro lenses 20 having a convex or concave configuration.

The base film 1 is preferably made of a material having an optical transparency. For example, the base film 1 may be formed from polyester, such as polyethylene terephthalate, polybutylene terephthalate or the like, polyethylene or polycarbonate. However, the material thereof is not limited particularly where an optically transparent property is required.

The light diffusing layer 2 has a plurality of micro lenses 20 of a convex or convex configuration of a toroidal surface whose cross section has a lens curvature different in the horizontal direction and the vertical direction of the principal surface of the base film 1. The light diffusing layer 2 may be made of any resin material only if it has an optically transparent property such as, for example, an acrylic type resin, a polyester resin, polyvinyl chloride, polyurethane or a silicone resin.

Each of the micro lenses 20 has a characteristic that, as the lens curvature decreases, the diffusion angle of light transmitted through the micro lens 20 increases, and the diffusion angle decreases as the lens curvature increases. Accordingly, in the present embodiment, the micro lens 20 is preferably set such that a cross section thereof in the horizontal direction of the field of view (transverse direction of the principal surface of the base film 1) has a small curvature whereas a cross section in the vertical direction of the field of view (vertical direction of the principal surface of the base film 1) has a great curvature. The particular curvature may be adjusted in accordance with the screen size, viewer position and so forth.

The size of the micro lens 20 preferably is, from a relationship to the size and the cycle of the pixels, approximately 10 µm to 200 µm in order to prevent moire fringes, and particularly preferably, an elliptic shape of the bottom surface of the micro lens 20 has a major axis of 20 µm to 200 µm and a minor axis of 3 µm to 6 µm. Further, the micro lenses 20 are preferably arranged in random arrangement.

Further, the micro lens 20 has an optical axis inclined so as to be directed to an assumed viewer position forwardly of the light diffusing film 3.

Characteristics of the micro lens 20 are described below with reference to FIGS. 2A to 4.

The shape of the micro lens 20 at an arbitrary position of the light diffusing film 3 is described with reference to FIGS. 2A to 2C.

Figure 2A:
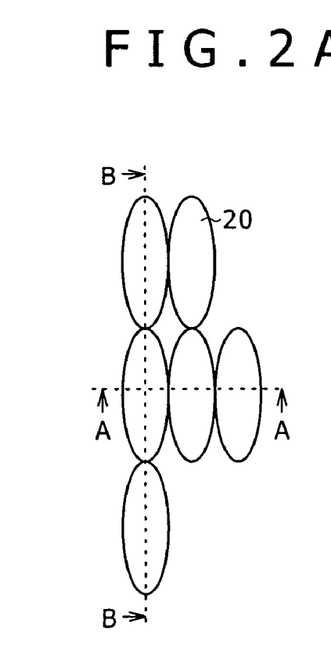
FIGS. 2A, 2B and 2C are schematic views showing a configuration of micro lenses of the light diffusing film of FIG. 1.

The micro lens 20 exhibits a substantially elliptical convex shape as seen in FIG. 2A when the light diffusing film 3 is viewed from the front, and the micro lenses 20 are arranged on the light diffusing layer 2 such that the substantially elliptic bottom surfaces of adjacent ones thereof contact with each other. It is to be noted that the direction along a line A-A in FIG. 2A corresponds to the transverse direction of the light diffusing film 3 (horizontal direction of the screen), and the direction along another line B-B corresponds to the vertical direction of the light diffusing film 3 (vertical direction of the screen).

Figure 2B:
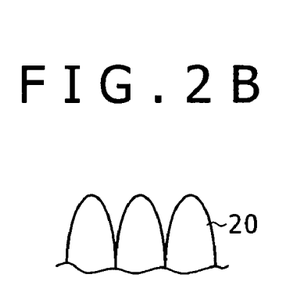

FIG. 2B shows a sectional shape of the micro lenses 20 on the section A-A of FIG. 2A. From FIG. 2B, it can be seen that the micro lenses 20 shown have the same convex shape. The sectional shape of each micro lens 20 may be a semicircular shape, a semi-elliptic shape, a parabolic shape or the like in outer profile, and the diffusion angle of the light diffusing film 3 in the vertical direction can be adjusted by the shape and the curvature of the sectional shape of the micro lenses 20. Further, the optical axes of the micro lenses 20 along the A-A section are all directed in a normal direction to the principal surface of the base film 1.

Figure 2C:
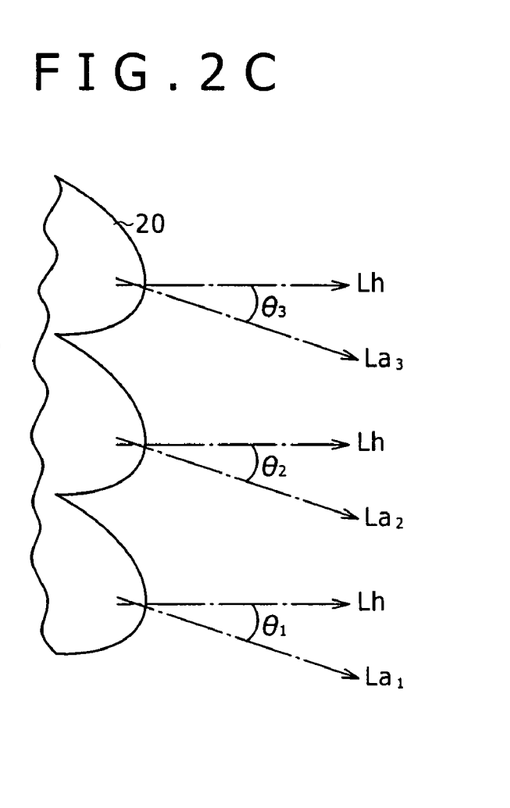

FIG. 2C shows a sectional shape of the micro lenses 20 along the B-B section of FIG. 2A.

The optical axes $L_{a1}$, $L_{a2}$ and $L_{a3}$ of the micro lenses 20 are inclined individually. Particularly, the optical axes $L_{a1}$, $L_{a2}$ and $L_{a3}$ are inclined by inclination angles $\theta_1$, $\theta_2$ and $\theta_3$, respectively, to the vertical direction of the principal surface of the base film 1 with respect to the normal line Lh to the principal surface of the base film 1.

Therefore, light fluxes transmitted through the micro lenses 20 are diffused centering around the optical axes $L_{a1}$, $L_{a2}$ and $L_{a3}$ inclined by the inclination angles $\theta_1$, $\theta_2$ and $\theta_3$, respectively. If the optical axes inclined in this manner are set so as to substantially coincide with the direction toward an assumed viewer position forwardly of the light diffusing film 3, then diffused light emitted from the light diffusing film 3 is distributed to the viewer. Consequently, the position of a peak of the luminance distribution in the diffusion characteristic can be displaced to the viewer side. It is to be noted that the inclination angles $\theta_1$, $\theta_2$ and $\theta_3$ of the optical axes are represented as positive (+) angles where they are angles of elevation with respect to the normal line Lh to the principal surface of the base film 1, but are represented as negative (−) angles where they are angles of depression. For example, the inclination angles $\theta_1$, $\theta_2$ and $\theta_3$ in FIG. 2C are negative (−) angles.

Figure 3:
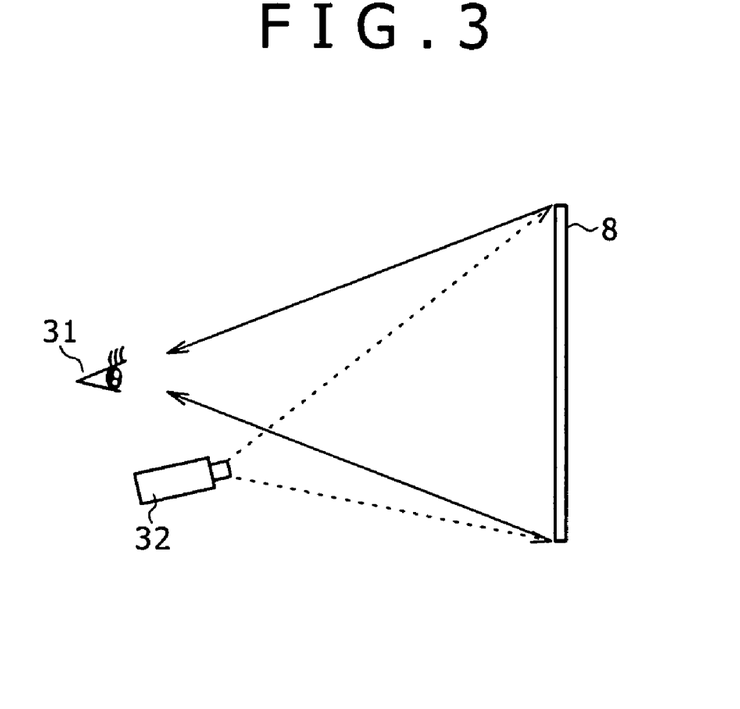
FIG. 3 is a schematic view illustrating an effect of a screen of the reflection type in which the light diffusing film of FIG. 1 is used.

It is to be noted that, since the angle toward the viewer is different among different positions of the micro lenses 20 on the base film 1, it is necessary to form the micro lenses 20 such that the inclination angles of the optical axes of the micro lenses 20 successively vary in order in the arrangement thereof so that all of the optical axes of the micro lens 20 may be directed toward the viewer. For example, in FIG. 2C, where the direction from the bottom to the top is a direction to the upper end of the light diffusing film 3, the inclination angles $\theta_1$, $\theta_2$ and $\theta_3$ should be set so as to gradually decrease in this order. Further, the inclination angles of the optical axes of the micro lenses 20 should gradually increase toward the lower end of the light diffusing film 3 from the border at an arbitrary position in the vertical direction of the light diffusing film 3. According to the configuration just described, where such a reflection type screen 8 as shown in FIG. 3 which includes the light diffusing film 3 is used, when light is projected from a projector 32, reflected light of the projected light even from the upper end and the lower end of the reflection type screen 8 reach a viewer 31 efficiently as shown schematically in FIG. 3.

The inclination angles of the optical axes of the micro lenses 20 are examined.

Figure 4:
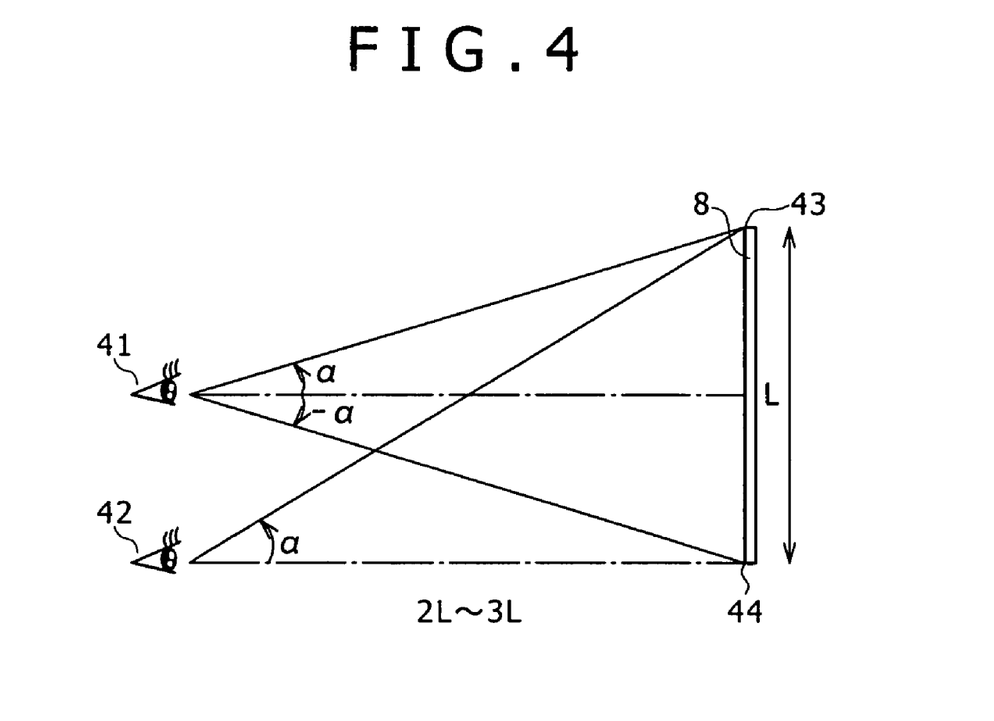
FIG. 4 is a schematic view illustrating an inclination angle of a micro lens of the screen shown in FIGS. 2A to 2C.

First, a case wherein the line of sight of the viewer is directed to the center of the screen is taken as an example. Referring to FIG. 4, the inclination angle of the optical axis of a micro lens 20 disposed at an upper end 43 of the reflection type screen 8, that is, the angle (inclination angle) defined by the line of sight in the horizontal direction from a visual point 41 and the line of sight toward the upper end 43 of the reflection type screen 8, is represented by $\alpha(°)$, and the inclination angle of the optical axis of another micro lens 20 disposed at a lower end 44 of the reflection type screen 8, that is, the angle defined by the line of sight in the horizontal direction and the line of sight toward the lower end 44 of the reflection type screen 8, is represented by $-\alpha(°)$. In this instance, the value of the inclination angle $\alpha$ is set based on the positional relationship between the reflection type screen 8 and the viewer and the diffusion characteristic of the light diffusing film in the vertical direction of the field of view.

Further, simply from only the positional relationship between the viewer and the reflection type screen 8, it is generally considered that the distance between them which is suitable for the appreciation is approximately L×2 or 3 where L is the vertical length of the screen.

Accordingly, where, in the positional relationship described above, the visual point 41 of the viewer is positioned forwardly of the center of the reflection type screen 8, the angles defined by the horizontal line of sight of the viewer and the lines of sight to the upper end 43 and the lower end 44 of the reflection type screen 8 are approximately 10° to 15° and approximately −15° to −10°, respectively. On the other hand, where the visual point of the viewer is at the point 42 forwardly of the lower end of the reflection type screen 8, the angle mentioned above is approximately 20° to 30°. Actually, however, it is necessary to additionally take the diffusion angle of the light diffusing film 3 in the vertical direction of the field of view into consideration. Where the diffusion angle is great, the $\alpha$ value may be smaller than the angle value given above, but conversely where the diffusion angle is small, the optical axes of the micro lens 20 should coincide accurately with the direction toward the viewer.

Generally, where the luminance of diffused light in the normal direction from the light diffusing film 3 is represented by 1, the angle (half-value angle) with which the luminance attenuates to ½ is represented by $\ominus$, and twice the half-value angle, that is, $2\ominus$, is defined as diffusion angle. Here, where the diffusion angle of the light diffusing film 3 in the horizontal direction of the field of view is same, as the diffusion angle in the vertical direction of the field of view decreases, an amount of light over a wider range is collected and therefore the luminance of light emitted and diffused from the light diffusing film is enhanced.

Further, where the screen is considered, the optimum value of the diffusion angle of the light diffusing film 3 in the vertical direction of the field of view is 10° to 30°. Where the diffusion angle is smaller than 10°, when the screen is viewed, the viewer is likely to have a glittering feeling, but conversely where the diffusion angle exceeds 30°, the diffusion of light becomes excessively great, and consequently, the luminance decreases and the screen becomes dark.

Where the diffusion angle in the vertical direction of the field of view is 10°, the inclination angle $\alpha$ of the optical axis of the micro lens 20 when the visual point of the viewer is forwardly of a central portion of the screen may be 5° to 10° where the positional relationship is taken into consideration. On the other hand, the inclination angle $\alpha$ of the optical axis of the micro lens 20 when the visual point of the viewer is forwardly of a portion in the proximity of the lower end of the screen is 15° to 25°.

On the other hand, where the diffusion angle in the vertical direction of the field of view is 30°, the inclination angle $\alpha$ of the optical axis of the micro lens 20 when the visual point of the viewer is positioned forwardly of a central portion of the screen may be nearly 0°. On the other hand, the inclination angle $\alpha$ of the optical axis of the micro lens 20 when the visual point of the viewer is positioned forwardly of a portion in the proximity of the lower end of the screen is 5° to 15°.

Accordingly, the inclination angle of the optical axis of each micro lens 20 should be set suitably within the range of −25° to 25° where the diffusion angle in the vertical direction of the field of view is 10° to 30°.

It is to be noted that, while, in the example described above, the optical axes of the micro lenses 20 are inclined only in the vertical direction of the light diffusing film 3, they may otherwise be inclined in both of the vertical and transverse directions of the light diffusing film 3 so that they may be directed forwardly of the center of the light diffusing film 3.

2. Method of Producing the Light Diffusing Film

A process of producing the light diffusing film 3 includes a transfer roll machining step for forming micro lens patterns, an application and contact bonding step of applying a resin material to a transfer roll and contact bonding a base material film to the transfer roll, and a hardening step of hardening the applied resin. In particular, the light diffusing film 3 is produced, for example, in accordance with the following procedure.

Transfer Roll Machining

Figure 5:
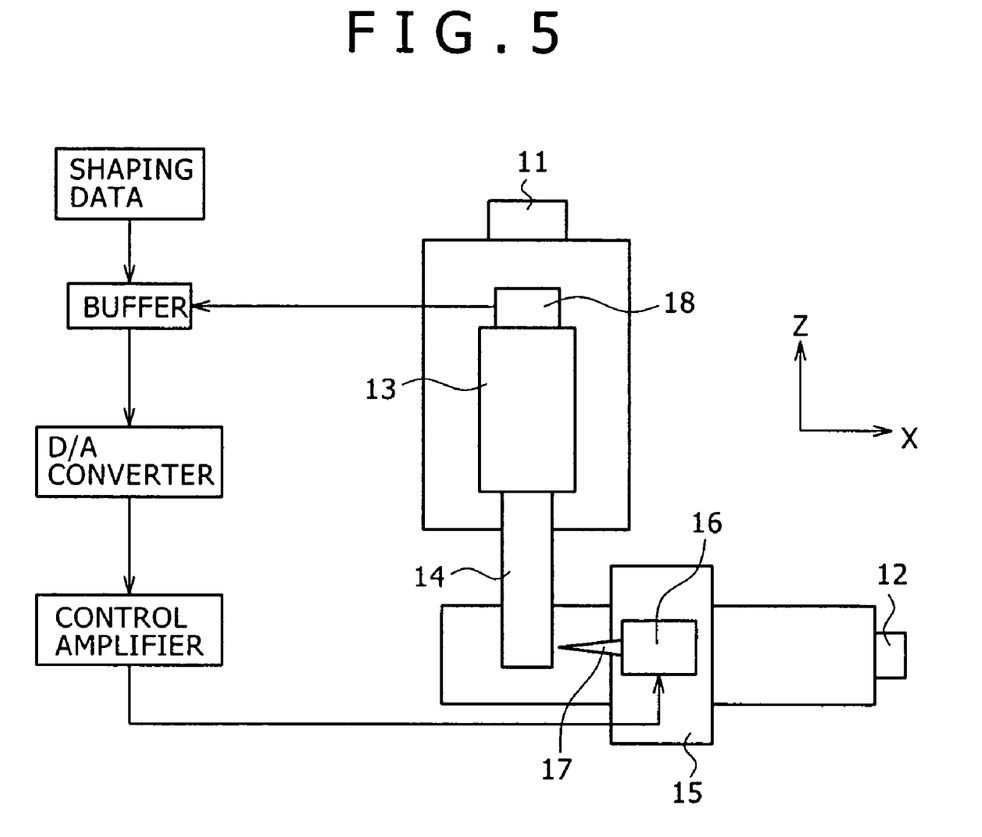
FIG. 5 is a diagrammatic and schematic view showing an example of a configuration of a transfer roll working machine for producing the light diffusing film of FIG. 1.

A transfer roll working machine shown in FIG. 5 is used to produce a plurality of micro lens patterns 21 of a concave shape whose section has different curvatures in a circumferential direction and an axial direction of a transfer roll 14. In particular, the surface of the transfer roll 14 is ground by continuously changing the cut-in amount of a cutting tool 17 in an interlocked relationship with rotation of the transfer roll 14 to form the micro lens patterns 21.

While the micro lens patterns 21 are successively formed on a circumference of the transfer roll 14 using the cutting tool 17, the position (maximum cutting tool cut-in position) at which the cut-in amount of the cutting tool 17 is maximum within a range of cutting of the cutting tool 17 is gradually displaced.

The transfer roll 14 has a surface on which patterns (micro lens patterns 21) for forming the micro lenses 20 are to be formed, and one light diffusing layer 2 is produced using the surface of the transfer roll 14 for one circumference. The transfer roll 14 is preferably made of a metal material suitable for precise formation of a fine configuration. For example, an aluminum alloy or a copper alloy which exhibits a good result of working is used preferably, and most preferably, anoxial copper is used. Although an iron type material is not suitable because it is difficult to precisely machine using a diamond cutting tool, it can be used if a working layer is formed by copper plating, Ni plating or the like.

The transfer roll working machine to be used during transfer roll machining preferably includes at least orthogonal movement shafts 11 and 12 for two X and Y axes and a rotary shaft 13 as shown in FIG. 5. Further, the transfer roll working machine generally performs turning of working the same by means of the cutting tool 17 while the transfer roll 14 is carried on and rotated by the rotary shaft 13. Further, a fine displacement tool table 16 is attached to a moving table 15 installed on the X axis.

The fine displacement tool table 16 includes a piezoelectric element actuator provided in the inside thereof for finely controlling the cut-in amount of the cutting tool 17 attached thereto into the transfer roll 14. The fine displacement tool table 16 is superior in the high speed responsibility and the positioning accuracy and is very effective for machining of a free curved surface like the micro lens pattern 21 as is required by the present invention.

The cutting tool 17 is preferably made of single crystal diamond which is superior in the shape maintaining performance with respect to an aluminum type alloy or a copper type alloy which is used popularly in ultraprecision machining.

Here, cutting control of the cutting tool 17 by the piezoelectric element actuator is described.

A rotary encoder 18 having approximately 30,000 steps per one rotation is attached to the rotary shaft 13, and working control data pass through a buffer in synchronism with an encoder pulse signal from the rotary encoder 18 and are sent to a control amplifier through a D/A converter. Then, the piezoelectric element actuator is controlled by a control signal from the control amplifier to determine the cut-in amount of the cutting tool 17 into the transfer roll 14, by which fine machining can be anticipated.

The micro lens patterns 21 are patterns for forming the micro lenses 20 by transfer and are formed by engraving the surface of the transfer roll 14 in a shape complementary to the shape of the micro lenses 20, that is, in a shape having a mirror image relationship to the shape of the micro lenses 20.

The shape of the micro lens patterns 21 at an arbitrary position of the transfer roll 14 is described with reference to FIGS. 6A to 6C.

Figure 6A:
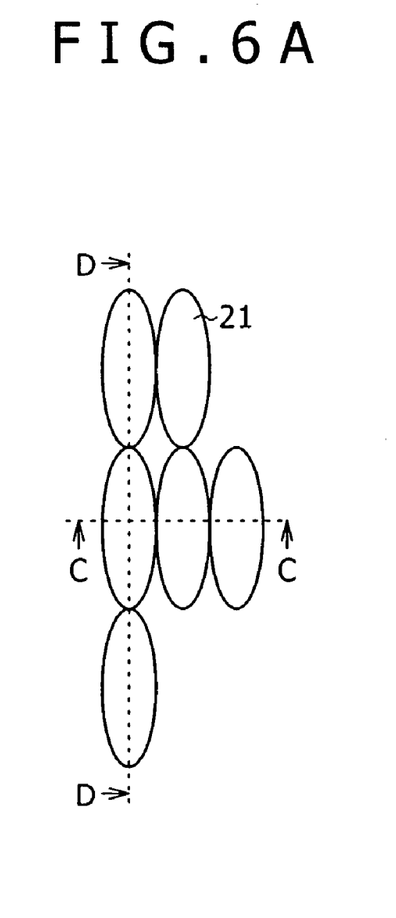
FIGS. 6A, 6B and 6C are schematic views showing a configuration of a micro lens pattern of a transfer roll used in the transfer roll working machine of FIG. 5.

When the transfer roll 14 is viewed from the front as seen in FIG. 6A, each of the micro lens patterns 21 exhibits a substantially elliptic concave shape, and the micro lens patterns 21 are arrayed on the surface of the transfer roll 14 such that the substantially elliptic shapes of adjacent ones of the micro lens patterns 21 nearly contact with each other. It is to be noted that the C-C direction in FIG. 6A is the widthwise direction of the transfer roll 14 and corresponds to the transverse direction of the light diffusing film 3 (A-A direction in FIG. 2). Meanwhile, the D-D direction is a circumferential direction of the transfer roll 14 and corresponds to the vertical direction of the light diffusing film 3 (B-B direction in FIG. 2).

Figure 6B:
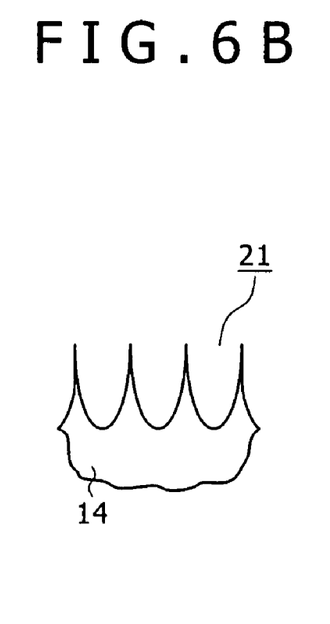

FIG. 6B shows a sectional shape of the micro lens pattern 21 along the C-C section of FIG. 6A. Referring to FIG. 6B, the micro lens patterns 21 shown have concave shapes same as each other. The shape of each concave surface is formed by the profile of the cutting tool 17 itself. For example, the outer profile of the cutting tool 17 may be a semicircular shape, a semi-elliptic shape, a parabolic shape or the like, and the diffusion angle in the vertical direction of the micro lenses 20 on the light diffusing film 3 can be adjusted depending upon the shape and the concave surface depth of the cutting tool 17. Further, In FIG. 6B, the deepest portion of each micro lens pattern 21 on the C-C section is at the center of the cut-in range of the cutting tool 17.

Figure 6C:
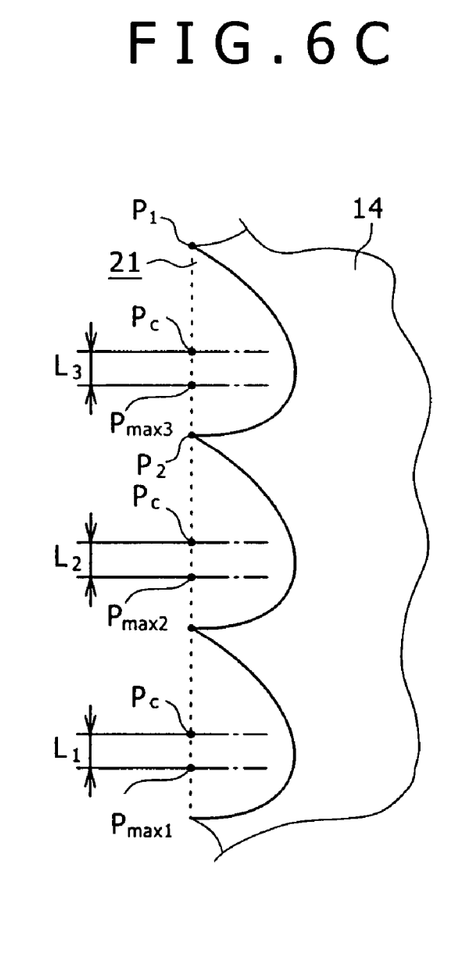

FIG. 6C shows a cross sectional shape of the micro lens patterns 21 along the D-D section of FIG. 6A.

Referring to FIG. 6C, the shape of the micro lens patterns 21 along the D-D section depends upon the speed of rotation of the transfer roll 14 and the cut-in amount of the fine displacement tool table 16 (piezoelectric element actuator), and the micro lens patterns 21 are formed by continuous machining on the circumference of the transfer roll 14 as the transfer roll 14 rotates.

In the present invention, the cutting locus of the cutting tool 17 is controlled to adjust the cross sectional shape of each micro lens pattern 21 thereby to set the diffusion characteristic of the micro lens 20 in the vertical direction of the field of view to a desired one.

More particularly, the positions (maximum cutting tool cut-in positions) $P_{max1}$, $P_{max2}$ and $P_{max3}$ at which the cut-in amount of the cutting tool 17 at the micro lens patterns 21 is maximum are displaced by distances $L_1$, $L_2$ and $L_3$ in a circumferential direction of the transfer roll 14 from the center Pc of the cutting depth ranges (for example, the range from $P_1$ to $P_2$) on the surface of the transfer roll 14, respectively. Here, the distances $L_1$, $L_2$ and $L_3$ may be calculated by optical calculation from the desired micro lenses 20 having inclined optical axes (for example, from the micro lenses 20 having the optical axes $L_{a1}$, $L_{a2}$ and $L_{a3}$ inclined by the inclination angles $\theta_1$, $\theta_2$ and $\theta_3$ in FIG. 2C). Particularly, the maximum cutting tool cut-in position should be determined so that the inclined optical axis of each micro lens 20 may substantially coincide with the direction toward the assumed viewer position forwardly of the light diffusing film 3 as described hereinabove with reference to FIGS. 2A to 2C.

It is to be noted that, since the inclination angles $\theta_1$, $\theta_2$ and $\theta_3$ of the optical axes of the micro lenses 20 are different from each other, it is necessary to successively vary the distances $L_1$, $L_2$ and $L_3$ of the micro lens patterns 21 little by little in accordance with the order in arrangement of them. For example, in FIG. 6C, the direction from the bottom to the top is a direction toward the upper end of the light diffusing film 3, and where the micro lenses 20 are formed such that the inclination angles of the optical axes thereof are in the negative (−) and successively decrease, the maximum cutting tool cut-in positions $P_{max1}$, $P_{max2}$ and $P_{max3}$ should be displaced downwardly in FIG. 6C and the distances $L_1$, $L_2$ and $L_3$ of them should gradually increase a little in this order. On the contrary, where the micro lenses 20 are formed such that the inclination angles of the optical axes thereof are in the positive (+) and successively increase toward the lower end of the light diffusing film 3, the maximum cutting tool cut-in positions $P_{max1}$, $P_{max2}$ and $P_{max3}$ should be displaced remotely to the lower end of the light diffusing film 3 from the center Pc and the distances of the displacement should gradually increase toward the lower end of the light diffusing film 3.

Here, a case wherein the visual point 41 of the viewer shown in FIG. 4 is positioned forwardly of the center of the reflection type screen 8 is considered.

Referring to FIG. 4, the inclination angle of the optical axis of a micro lens 20 disposed at the upper end 43 of the reflection type screen 8, that is, the angle (inclination angle) defined by the line of sight in the horizontal direction from the visual point 41 and the line of sight toward the upper end 43 of the reflection type screen 8, is represented by $\alpha(°)$, and the inclination angle of the optical axis of another micro lens 20 disposed at the lower end 44 of the reflection type screen 8, that is, the angle defined by the line of sight in the horizontal direction and the line of sight toward the lower end 44 of the reflection type screen 8, is represented by $-\alpha(°)$. Further, the total pulse step number of the rotary encoder 18 of the transfer roll machine is represented by M. In this instance, the inclination angle $\theta i(°)$ of the micro lens optical axis at the $i_{th}$ pulse position where the machining starting position is set to the lower end 44 is represented by the following expression:

$$\theta i = -\alpha + 2\alpha/M \times i (0 \leq i \leq M)$$

In particular, in this instance, the maximum cutting tool cut-in position should be set to perform machining such that the optical axis of a micro lens in the vertical direction of the field of view is successively varied from $\alpha(°)$; the angle defined by the upper end of the reflection type screen 8 and the viewer is positive) to $-\alpha(°)$ where a line of sight in the proximity of the horizontal line of light of the visual point 41 is defined as 0° (the micro lens optical axis and the direction of the viewer coincide with each other).

Applying and Contact Bonding

After a resin material which hardens itself when it absorbs energy is applied to fill the surface of the transfer roll 14 on which the micro lens patterns 21 are formed, the base film 1 is wrapped around and contact bonded to the transfer roll 14.

Here, an ultraviolet curing resin having an optically transparent performance is suitably used for the resin described above. While various resin materials such as, for example, an acrylic type resin, a polyester resin, polyvinyl chloride, polyurethane or a silicone resin can be used, the resin to be used is not limited to a particular one.

Hardening

Energy is applied by illumination of ultraviolet rays or the like to harden the resin to form a light diffusing layer 2 having a group of micro lenses 20 and adhere the light diffusing layer 2 to the base film 1. Then, the light diffusing layer 2 and the base film 1 are exfoliated from the transfer roll 14 to obtain a light diffusing film 3.

While some other method like a thermal press work method can be applied as the method of transferring the concave and convex configuration of the surface of the transfer roll to form micro lenses, the method described above is optimum as a technique for accurately transferring a fine shape.

Further, in place of the method which uses such a transfer roll as described above, another method may be used wherein micro lens patterns 21 are formed by machining or the like on the surface of a transfer plate in the form of a flat plate to form a light diffusing layer 2 and then the base film 1 is contact bonded to the light diffusing layer 2 to form a light diffusing film 3.

Reflection Type Screen

Figure 7:
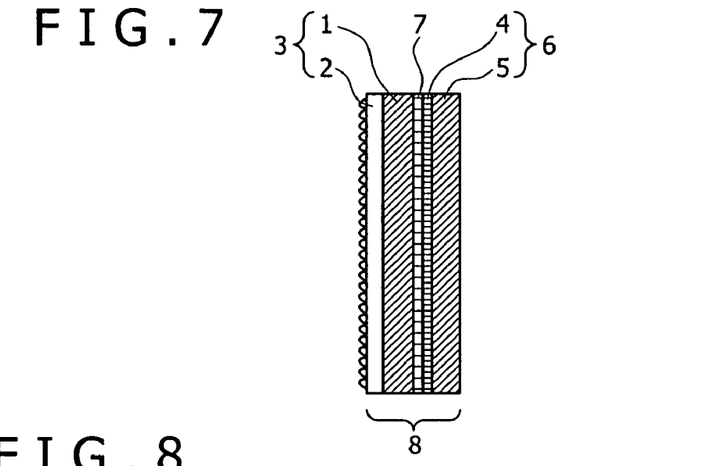
FIG. 7 is a schematic sectional view showing a configuration of a screen according to an embodiment of the present invention.

An example of a structure of a reflection type screen according to the present invention is shown in FIG. 7. The reflection type screen 8 is configured such that a reflecting film 6 formed from a reflecting layer 4 provided on a support member 5 and such a light diffusing film 3 as described above are adhered to each other by an adhesive layer 7.

The support member 5 is transparent and may be formed from any of a transparent film, a glass plate, an acrylic plate, a methacrylic styrene plate, a polycarbonate plate, a lens and so forth only if it satisfies desired optical characteristics. As the optical characteristics, preferably the refractive index of the material from which the support member 5 is formed is 1.3 to 1.7; the optical haze of the material is 8% or less; and the transmission factor of the material is 80% or more. Further, the support member 5 may have an antiglare function.

The transparent film preferably is a plastic film, and preferably, the material for forming the film is, for example, a meth(acrylic) type resin such as a copolymer of a cellulose derivative (such as, for example, diacetyl cellulose, triacetyl cellulose (TAC), propionyl cellulose, butyryl cellulose, acetyl propionyl cellulose and nitrocellulose), polymethyl methacrylate or methyl methacrylate with vinyl monomer such as some other alkyl(meth)acrylate or methyl methacrylate; a polycarbonate type resin such as polycarbonate or diethylene glycol bis aryl carbonate (CR-39); a thermosetting(meth) acrylic type resin such as single polymer or copolymer of (brominated) bis phenol A type di(meth)acrylate or polymer or copolymer of urethane denatured monomer of (brominated) bis phenol A mono(meth)acrylate; polyester, particularly polyethylene terephthalate, polyethylene naphthalate and unsaturated polyester; acrylonitrile-styrene copolymer, polyvinyl chloride, polyurethane, an epoxy resin or the like. Also it is possible to use an aramid type resin taking the heat-resisting property into consideration. In this instance, it is estimated that the upper limit to the temperature in heating is higher than 200° C. to increase the temperature range.

The plastic film can be obtained by a method of stretching any of the resins or diluting any of the resins with solvent and forming the resin into a film and then drying the film or a like method. As regards the thickness of the plastic film, although it is better for the plastic film to have a greater thickness from the side of the rigidity, preferably it is thinner from the side of the haze. Thus, the thickness of the plastic film normally is approximately 25 μm to 500 μm.

Further, the surface of the plastic film may be coated with a coating material such as a hard coat. Where the coating material exists as an underlying layer of an optical multilayer film made of inorganic and organic matters, it is possible to enhance various physical properties such as the adhesive property, hardness, chemical resistance, durability and dye-affinity.

The reflecting layer 4 may be formed from an optical film for reflection which is used in a screen of the reflection type, and for example, an aluminum deposited film or an optical multilayer film which is described below may be used.

The optical multilayer film is a film wherein a high refractive index film 4H and a low refractive index film 4L having a refractive index lower than that of the high refractive index film 4H are laminated alternately and which has a selective reflection characteristic.

The high refractive index films 4H and the low refractive index films 4L can be formed by any of dry processes such as sputtering and wet processes such as spin coating or dip coating.

Where the high refractive index films 4H and the low refractive index films 4L are formed by a dry process, various materials can be used as a material for the high refractive index films 4H only if the refractive index thereof ranges approximately from 2.0 to 2.6. Similarly, various materials can be used as a material for the low refractive index films 4L only if the refractive index thereof ranges approximately from 1.3 to 1.5. For example, the high refractive index films 4H may be formed from $TiO_2$, $Nb_2O_5$ or $Ta_2O_5$, and the low refractive index films 4L may be formed from $SiO_2$ or $MgF_2$.

Where the high refractive index films 4H and the low refractive index films 4L are formed by a dry process, the thickness of each film of the optical multilayer film should be designed through a simulation based on a matrix method such that the optical thin film has a high reflection characteristic with respect to light in a particular wavelength band and has a high transmission characteristic at least with respect to light of the visible wavelength region other than the wavelength band mentioned above. The simulation based on a matrix method here is a technique disclosed in Japanese Patent Laid-Open No. 2003-270725. According to the technique, a simulation is performed utilizing the principle that, when light enters at an angle $\theta_0$ into a multilayer optical thin film system wherein multiple reflection occurs at the boundary between different layers formed from a plurality of different materials, the phases of multiple reflected lights are arranged in order depending upon the type and the wavelength of the light source used and the optical film thickness of each layer (product of the refractive index and the geometrical film thickness) and the speed of the reflected light sometimes indicates coherence, which causes the lights to interfere with each other, and film thickness design of an optical film having a desired characteristic is performed based on a result of the simulation.

In the present invention, the wavelength regions of light of the three primary colors of R, G and B which is used as image light by a projector light source may be selected as a particular wavelength region, and film thickness design may be performed through a simulation based on a matrix method such that only light in the wavelength regions is reflected by the optical multilayer film while light in any other wavelength region than the wavelength regions is transmitted through the optical multilayer film. Where the high refractive index films 4H and the low refractive index films 4L having such thicknesses designed in this manner are laminated, an optical multilayer film which functions well as a three-primary color wavelength band filter can be implemented with certainty.

Further, the number of optical layers which form the optical multilayer film formed by a dry process is not limited particularly but may be any number. Preferably, however, the optical multiplayer film is formed from an odd number of layers with the high refractive index film 4H used as outermost layers disposed on the light incoming side and the opposite side.

Where the optical multilayer film is formed by a wet process, it should be formed as an odd-number layer film wherein high refractive index films 4H obtained by applying and hardening a solvent type coating material for a high refractive index film and low refractive index films 4L obtained by applying and hardening a solvent type coating material for a low refractive index and serving as an optical film of a refractive index lower than that of the high refractive index films 4H are laminated alternately. Further, each of the optical films should be formed by applying a coating material containing a resin which absorbs energy applied thereto by heating or illumination of ultraviolet rays and shows a reaction. For example, the high refractive index films 4H may be formed from an OpStar made of a thermosetting resin of JSR (JN7102, refractive index: 1.68) while the low refractive index films 4L are formed from another OpStar made of a thermosetting resin of JSR (JN7215, refractive index: 1.41). This provides flexibility to the optical multilayer film.

The material of the high refractive index films 4H is not limited to such a thermosetting resin as described above, but may be a solvent type coating material only if a refractive index of approximately 1.6 to 2.1 can be assured. Meanwhile, the material of the low refractive index films 4L is not limited to such a thermosetting resin as described above, but may be a solvate type coating material only if a refractive index of approximately 1.3 to 1.59 can be assured. It is to be noted that the number of laminated layers can be reduced as the difference in refractive index between the high refractive index films 4H and the low refractive index films 4L increases.

Where the high refractive index films 4H and the low refractive index films 4L are formed by a wet process, the thickness of each film of the optical multilayer film 23 is designed such that the optical multilayer film 23 has a high reflection characteristic in that it has a refractive index, for example, higher than 80% with respect to light of three-primary color wavelength light including lights in the wavelength regions of red, green and blue but has a high transmission characteristic in that it has a transmission factor of, for example, 80% or more with respect to light in any other wavelength region than that in the three-primary color wavelength region of the visible wavelength region. The thickness of each film of the optical multilayer film 23 may be designed so that, where the thickness of the film is represented by d, the refractive index of the film by n and the wavelength of light incoming to the optical multilayer film 23 by λ, the optical thickness nd of the film may satisfy the following expression (1) with respect to the wavelength λ of the incoming light:

$$nd = \lambda(\alpha \pm \frac{1}{4}) \tag{1}$$

where α is a natural number.

For example, if an optical multilayer film is formed such that it has a 19-layer structure wherein the high refractive index film 4H (refractive index: 1.68) having a film thickness of 1,023 nm and the low refractive index film 4L (refractive index: 1.41) having another film thickness of 780 nm are laminated each by 9 layers and another high refractive index film 4H is laminated on the lamination, then it has a high reflection factor of 80% or more with respect to light in the three-primary color wavelength band from projector light (light from a projector light source for which, for example, a laser oscillator is used) while it has a high transmission characteristic wherein the reflection factor is lower than 20% with respect to light in the wavelength bands (stray light) around the three-primary color wavelength band.

It is to be noted that, where the reflecting layer 4 is formed as an optical multilayer film, a dark light absorbing layer may be provided on the rear surface side of the support member 5 in FIG. 7.

The dark light absorbing layer is provided to absorb light having transmitted through the reflecting layer 4 (optical multilayer film) and the support member 5 and may be formed, for example, by adhering a black resin film to the rear surface side of the support member 5 (on the surface remote from the light diffusing film 3).

Or, the dark light absorbing layer may be a layer obtained by application of a black coating material.

The black coating material may be fine particles of carbon black, fine particles of silica coated with carbon black or like fine particles. Such fine particles may have electric conductivity.

Fine particles of carbon black can be produced by an oil furnace method, a channel method, a lamp method, a thermal method or a like method.

In order to submerge the black color, the primary particle size and the dispersion property of the fine particles make significant factors for determining the color of a film to be applied, and the jet-black property enhances as the primary particle size decreases and the surface area increases. Further, carbon block having many primary functional groups has a high affinity with vehicles having a polar functional group such as an OH radical or a carboxyl radical, and if it is combined with a carbon hydride having a low polarity, then the wettability thereof with resin is enhanced and the luster and the jet-black property thereof increase. Further, a curing agent having the isocyanate radical or the carboxyl radical which is reactive with a functional group of the resin described above should be added to the carbon black to harden the applied film.

Although the amount of surface functional groups is generally greater with channel carbon than with furnace carbon, even where the furnace method is used, the amount of functional groups can be increased by applying an oxidation process. The primary particle size of the carbon black is preferably smaller than 30 nm, and more preferably smaller than 20 nm. As the particle size increases, the jet-black degree decreases and the performance of the light absorbing layer drops.

The application method may be any of conventionally known methods such as screen application, blade application and spray application.

The film thickness preferably is approximately 10 μm to 50 μm, and more preferably is 15 μm to 25 μm. Where the film thickness is smaller than 10 μm, particularly in the case of spray application, the jet-black performance deteriorates. On the other hand, where the film thickness is greater than 50 μm, the applied film becomes fragile and a crack is likely generated.

With the reflection type screen 8 wherein an optical multilayer film is used as the reflecting layer 4 and which includes a dark light absorbing layer as described above, surface diffusion of incoming light to the screen is suppressed, and selective reflection wherein light of a particular wavelength is reflected while incoming light of any other wavelength region such as external light is transmitted or absorbed can be achieved. Consequently, the black level of a projected image on the reflection type screen 8 can be lowered to achieve a high contrast, and even where the room is bright, a projected image having a high contrast can be displayed. For example, when light from an RGB light source such as a diffraction grating type projector which uses a grating light valve (GLV) apparatus is projected on the reflection type screen 8, the viewer can appreciate, on the reflection type screen 8, a good projected image which has a wide angle of view and a high contrast and is free from projection of external light.

In particular, light incoming to the reflection type screen 8 is transmitted through the light diffusing film 3 and comes to the reflecting layer 4 (optical multilayer film). External light components included in the incoming light are transmitted through the reflecting layer 4 and absorbed by the dark light absorbing layer while only light in the particular wavelength region for a projected image is reflected. The reflected light is diffused by the surface of the light diffusing film 3 and appreciated as image light having a wide angle of view by the viewer. Accordingly, the influence of external light on image light which is the reflected light can be excluded with a high level, and consequently, such a projected image having a high contrast and a uniform luminance distribution which is not conventionally available can be provided.

EXAMPLE

An example wherein the present invention is carried out actually is described below. It is to be noted that the example is only for illustration and the present invention is not limited to this.

According to the present example, a reflection type screen having the configuration shown in FIG. 7 was produced in the following manner.

Production of an Optical Diffusion Film

Anoxial copper was used as the material of the transfer roll 14 for forming the light diffusing layer 2, and a single crystal diamond cutting tool (produced by Allied Material) having a tip end of a radius of 10 μm was used as the cutting tool 17 on the transfer roll working machine. The cutting tool 17 was attached to the fine displacement tool table of a very high precision lathe (produced by Toshiba Machine Machinery), which is a transfer roll working machine. Then, the piezoelectric element actuator (response band: 30 kHz, amplitude: 13 μm) was controlled to machine anisotropic micro lens patterns 21 wherein the curvature ratio of sections in the horizontal and vertical directions of the field of view was approximately 1:4. At this time, the cutting locus in a circumferential direction of the roll had a parabolic shape, and the maximum inclination angle of the optical axis of the micro lenses 20 was 5°. In particular, the micro lens patterns 21 were machined in such an inclined relationship that the inclination angle of the axis of a micro lens 20 at a portion corresponding to an upper end portion of the reflection type screen 8 was 5°; that at a portion corresponding to a central portion of the reflection type screen 8 was 0°; and that at a portion corresponding to a lower end portion of the reflection type screen 8 was −5°.

An urethane acrylate type ultraviolet curing resin (produced by Toagosei Co., Ltd.) was applied to the transfer roll 14 for light diffusing film formation worked in such a manner as described above, and a PET film (produced by Toyobo Co., Ltd.: A-4100) of 100 μm thick was contact bonded as the base film 1. Then, light was illuminated from a high-pressure mercury-vapor lamp (120 W/cm) to harden the ultraviolet curing resin to form the light diffusing layer 2. Thereafter, the light diffusing layer 2 and the base film 1 were exfoliated from the transfer roll 14 to obtain a desired light diffusing film 3.

Production of the Reflecting Film

The reflecting film 6 has a structure wherein a reflecting layer 4 is provided on a support member 5. The support member 5 preferably has a flat and smooth surface, and here, a material (PET film) same as that used for the base film 1 was used. The PET film was attached to a vacuum vapor deposition machine to vapor deposit an Al film of approximately 0.1 μm to the PET film to form a reflecting layer 4 to obtain a reflecting film 6.

Then, the reflecting film 6 was joined by contact bonding to the light diffusing film 3 through an adhesive layer 7 made of a pressure-sensitive bonding agent to produce a reflection type screen 8 of the 42-inch size (16:9).

Comparative Example

As a comparative example, a reflection type screen of the 42-inch size (16:9) was produced by a production method similar to that used for production of the example described above except that, from among the conditions of the example, in the working of the transfer roll 14, the optical axes of the micro lenses 20 were not inclined but all of the optical axes were made coincide with the normal direction to the outer circumferential surface of the transfer roll 14 when the micro lenses 20 were machined.

Figure 8:
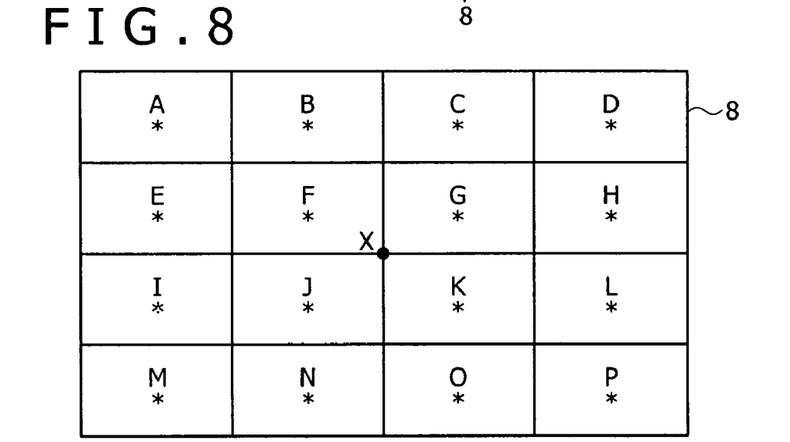
FIG. 8 is a view showing luminance measuring points on the screen shown in FIG. 7.

The reflection type screens produced in such a manner as described above were each divided into 16 portions (subdivisions A to P) as seen in FIG. 8, and the luminance at the center of each subdivision was measured.

In particular, the reflection type screens 8 of the example and the comparative example were adhered to a wall surface (side wall of a room) perpendicular to the floor such that the centers thereof were positioned at the height of 1.2 m. Further, a liquid crystal projector (produced by SONY Corporation, VPL-CX5) of an optical power of 2,000 ANSI lumen was disposed at a position spaced by 1 m in the horizontal direction from the wall surface in an opposing relationship to the front surface. A white screen was projected from the projector, and the luminance at the center position of each of the 16 subdivisions was measured using a luminance meter (produced by TOPCON Corporation, BM-9) at the position spaced by 1.5 m from the wall and at the height of 1.2 m. It is to be noted that the measurement values are represented by relative values where the luminance at the central point X of the screen is defined as 1.

Figure 9:
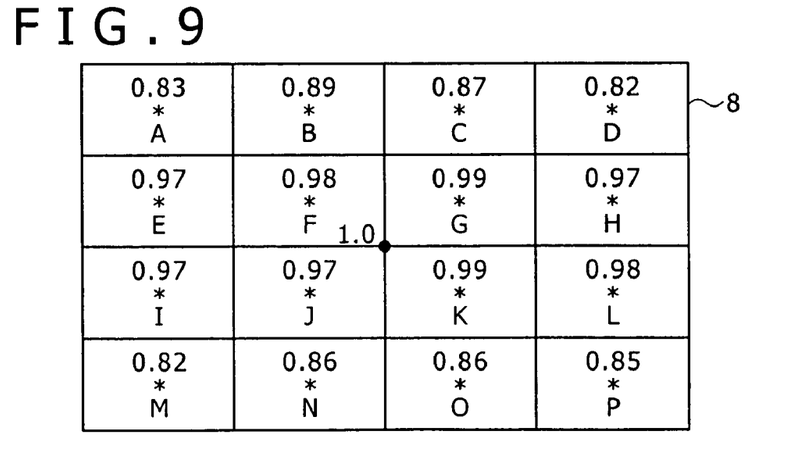
FIG. 9 is a view illustrating a result of a luminance measurement at the luminance measuring points shown in FIG. 8.
Figure 10:
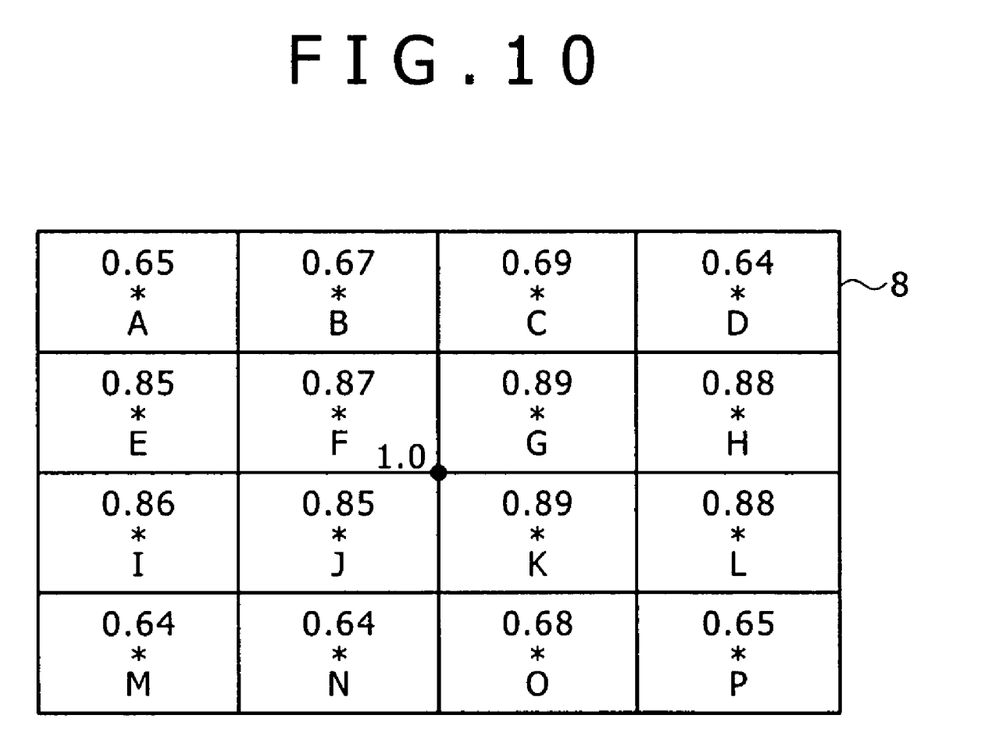
FIG. 10 is a similar view but illustrating a result of a luminance measurement of a comparative example.

A result of the luminance measurement of the example is illustrated in FIG. 9 while a result of the luminance measurement of the comparative example is illustrated in FIG. 10. Numeric values in FIGS. 9 and 10 represent luminance values of the result of the measurement at individual subdivision positions.

It can be seen from FIGS. 9 and 10 that, at the subdivisions A to D at an upper end portion of the screen and the subdivisions M to P at a lower end portion of the screen, the luminance is higher by approximately 20% in the example than in the comparative example, and diffusion light is distributed favorably to the subdivisions. Further, also at central portions (subdivisions E to H and I to L) of the screen, the luminance in the example exhibits enhancement by approximately 10% when compared with that in the comparative example. Also by visual examination, non-uniformity was little discriminated in the example while shortage in luminance appearing as a stripe was confirmed at upper and lower end portions of the screen in the comparative example.

In summary, it was confirmed that the reflection type screen in which the light diffusing film according to the present invention is used can provide an image having a high luminance and having no non-uniformity in luminance.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A light diffusing film, comprising:
a base film; and
a light diffusing layer formed on a principal surface of said base film and having a group of micro lenses each having a convex or concave shape on a light exit surface of the micro lens, the shapes having different curvatures from each other along cross sections in a transverse direction and a vertical direction of the principal surface of said base film;
the shape of the micros lenses being an elliptical shape and including an elliptically shaped bottom surface, the bottom surfaces of adjacent micro lenses being in contact with each other, and
said micro lenses individually having optical axes which are inclined toward the position of an assumed viewer forwardly of said light diffusing film.

2. The light diffusing film according to claim 1, wherein the optical axes of said micro lenses are inclined in the vertical direction of the principal surface of said base film.

3. The light diffusing film according to claim 2, wherein the inclination angle of the optical axis of each of said micro lenses is 0° at a position on the principal surface of said base film which coincides with a horizontal line of sight of the assumed viewer and gradually decreases in a direction toward an upper end of said base film and gradually increases in a direction toward a lower end of said base film as a distance increases in the vertical direction from the position.

4. The light diffusing film according to claim 2, wherein the inclination angles of the optical axes of said micro lenses range from −25° to 25°.

5. The light diffusing film according to claim 1 wherein said elliptical shape has a major axis of 20 μm to 200 μm and a minor axis of 3 μm to 6 μm.

6. A screen, comprising:
a support member;
a reflecting layer provided on said support member; and
a light diffusing film provided on said reflecting layer and including a base film and a light diffusing layer formed on a principal surface of said base film and having a group of micro lenses each having a convex or concave shape which on a light exit surface of the micro lens, the shapes having different curvatures from each other along cross sections in a transverse direction and a vertical direction of the principal surface of said base film,
the shape of the micros lenses being an elliptical shape and including an elliptically shaped bottom surface, the bottom surfaces of adjacent micro lenses being in contact with each other, and
said micro lenses individually having optical axes which are inclined toward the position of an assumed viewer forwardly of said light diffusing film.

7. The screen according to claim 6, wherein said reflecting layer is an optical multilayer film which includes a first optical film having a high refractive index and a second optical film having another refractive index lower than that of the first optical film, the first and second optical films being laminated alternately to form 2n+1 layers which form said reflecting layer, n being an integer equal to or greater than 1, said optical multilayer film having a high reflection characteristic with respect to light in a particular wavelength region while said optical multilayer film has a high transmission characteristic with respect to light at least in the visible wavelength region other than the particular wavelength region.

8. The screen according to claim 7, further comprising a dark light absorbing layer provided on a rear surface side of said support member.

9. The light diffusing film according to claim 6 wherein said elliptical shape has a major axis of 20 μm to 200 μm and a minor axis of 3 μm to 6 μm.

* * * * *